United States Patent

Bartys

[11] 3,807,078
[45] Apr. 30, 1974

[54] FISHING TIP-UP APPARATUS

[76] Inventor: Bernard A. Bartys, 105 Church, Standish, Mich. 48658

[22] Filed: June 7, 1972

[21] Appl. No.: 260,424

[52] U.S. Cl. ................................................ 43/17
[51] Int. Cl. ......................................... A01k 97/12
[58] Field of Search .................................. 43/17, 16

[56] References Cited
UNITED STATES PATENTS

| | | | |
|---|---|---|---|
| 2,653,405 | 9/1953 | Monahan | 43/16 |
| 1,571,603 | 2/1926 | Ruggles | 43/16 |
| 2,636,303 | 4/1953 | Feigley et al. | 43/17 |
| 2,693,045 | 11/1954 | John | 43/16 |
| 1,451,124 | 4/1923 | Stolze | 43/16 |

Primary Examiner—Louis G. Mancene
Assistant Examiner—Daniel J. Leach
Attorney, Agent, or Firm—Learman & McCulloch

[57] ABSTRACT

A fishing tip-up comprises a support having a bail mounted thereon for swinging movements about an axis to positions on opposite sides of the axis, the bail having its bight shaped to form a slotted tongue adapted for removable accommodation in a loop formed at one end of a resilient signal arm, the opposite end of the signal arm being mounted on the support at a predetermined distance to one side of the axis about which the bail swings. The signal arm may be bowed and its loop end fitted over the bail tongue so that the resilience of the signal arm tends to swing the bail in a direction such as to enable the loop to disengage the tongue, whereupon the signal arm may move to an upright, signaling position. A latching member hinged at one end to the support is bent between its ends to form an angular knee which may fit into the slotted tongue so as to prevent release of the signal arm from the tongue until such time as the latching member is withdrawn from the slot. The latch member may be withdrawn from the slot in response to the exertion of a tug on a fishing line associated with the apparatus.

13 Claims, 6 Drawing Figures

PATENTED APR 30 1974 3,807,078

FISHING TIP-UP APPARATUS

The invention disclosed herein relates to a fishing tip-up of the kind especially adapted for use in ice fishing and more particularly to apparatus for latching a signal arm in a cocked, retracted position such that it may be released and assume an upright, projected position signifying the hooking of a fish on a fishing line associated with the tip-up apparatus.

The prior art discloses many different kinds of fishing tip-ups, but not all of them are altogether satisfactory from a number of reasons. For example, some of the tip-ups require the utilization of a reel on which the fishing line is wound, and the reel must be under water when the tip-up is in use. In a construction of this kind, the reel has to be removed from the water whenever a fish is caught or whenever the hook is to be examined. It is not uncommon, therefore, for the water clinging to the reel to become frozen, thereby causing problems in manipulating the tip-up.

Others of the previously known tip-ups necessitate the purchase of an especially designed reel or fishing rod, or both, thereby adding considerably to the expense of ice fishing.

All of the known tip-ups utilize means of some kind for signaling the hooking of a fish. In many of the prior art tip-ups, however, the mechanism for actuating the signaling means is unreliable in that it is affected by the wind. In most instances the signal actuating mechanism is operated by movement of the fishing line, and in some constructions the mechanism is incapable of being actuated if the line is moved in a direction other than one which imposes no binding force on the latch release.

Still others of the known tip-ups have other objectionable characteristics, such as the requirement that the fishing line be tied between its ends to some part of the signaling apparatus, thereby imposing a restriction upon the length of the run the fish may take after it has been hooked.

An object of this invention is to provide a tip-up which overcomes the objectionable characteristics referred to above.

Another object of the invention is to provide a fishing tip-up having a signaling member which may be securely latched in a cocked position for movement to a signaling position and wherein the latch release mechanism is operable regardless of the direction in which a fish moves a fishing line and which is impervious to release except in response to the hooking of a fish.

A further object of the invention is to provide a tip-up of the character described and which is usable either with or without a fishing rod and reel.

Other objects and advantages of the invention will be pointed out specifically or will become apparent from the following description when it is considered in conjunction with the appended claims and the accompanying drawings, in which:

Figure 5:
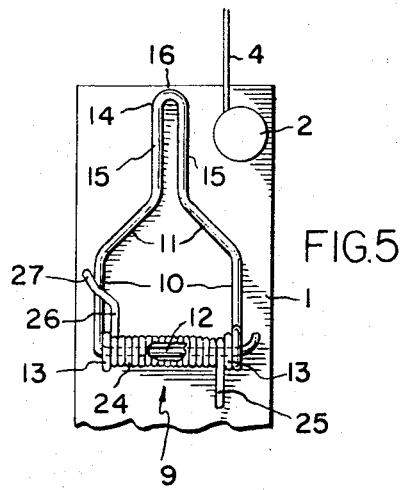
FIG. 5 is an enlarged, fragmentary front elevational view of the latching mechanism in its released condition.

Apparatus constructed in accordance with the invention comprises a support member 1 formed of any suitable material, such as wood, and having tripod-like legs (not shown) at its lower end which may rest upon the surface of ice or the like so as to support the member 1 in an upright position. At the upper end of the support member 1 is a mounting post 2 which mounts one end of a signal arm 3. The arm 3 preferably comprises a resilient, spring wire rod having a straight portion 4 anchored at one end to the post 2 and being joined at its other end to a coiled spring portion 5 to which is joined another straight portion or shank 6 that terminates at its free end in a coupling loop 7. Fixed on the shank 6 adjacent the loop 7 is a signal flag 8. The post 2 preferably is adjustable through 180° so as to enable the arm 3 to move from a position overlying the member 1 to an upright, projected signaling position extending in prolongation of the member 1, as is shown in dotted lines in FIG. 1.

A control member 9 is mounted adjacent the upper end of the member 1, but at a predetermined distance below the level of the post 2, for swinging movements about a horizontal axis. The control member 9 comprises a bail having a pair of parallel legs 10 joined at corresponding ends by a bight 11. one of the legs 10 is joined to an arm 12 that passes through a pair of hinge loops 3 fixed to the member 1. The free end of the other leg 10 preferably is looped around the free end of the arm 12.

Figure 1:
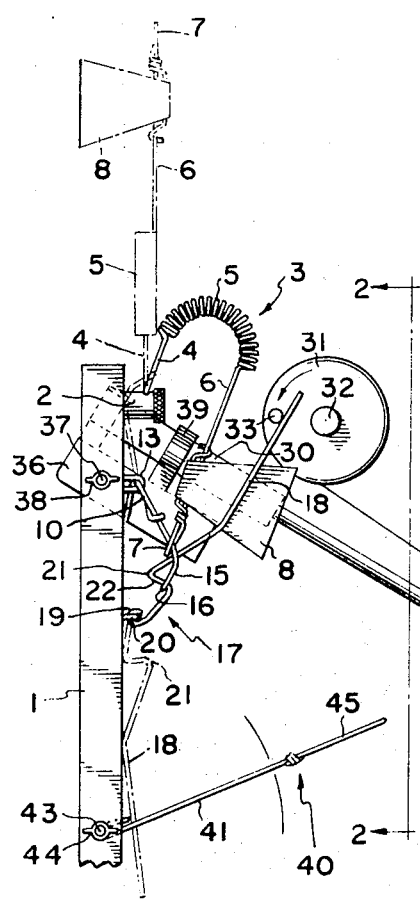
FIG. 1 is a fragmentary, side elevational view of a tip-up constructed according to the invention and adapted for use with a rod and reel.
Figure 3:
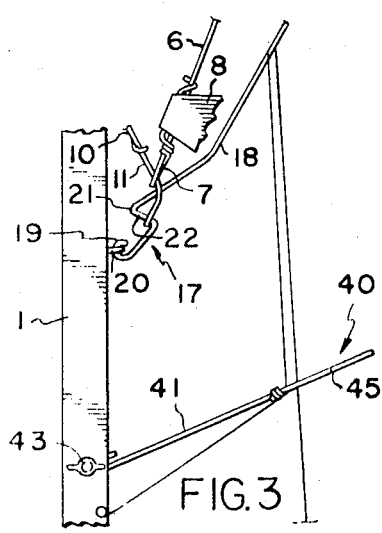
FIG. 3 is a fragmentary view similar to FIG. 1, but illustrating the tip-up in use without a rod and reel.

The bight 11 of the control bail 9 is shaped to form an elongate tongue 14 having closely spaced limbs 15 joined by a smoothly rounded tip 16, the spacing between the limbs 15 providing an elongate slot. As is best shown in FIGS. 1 and 3 the tongue 14 is arcuate.

Figure 6:
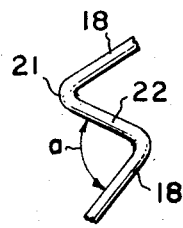
FIG. 6 is a fragmentary detail of a portion of the latch member.
Figure 4:
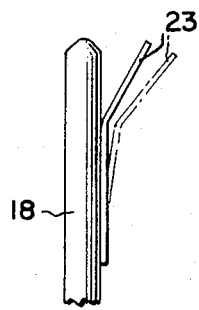
FIG. 4 is an enlarged, fragmentary detail of a portion of the apparatus.

The apparatus includes a latching member 17 comprising an elongate rod 18 having a loop 19 at one end which receives a hinge ring 20 fixed to the support 1 below the hinge axis of the control member 9. Between its ends the rod 18 is bent to form an angular knee 21 which is spaced from the rod 18 by a leg 22. The included angle $a$ between the leg 22 and the adjacent portion of the rod 18 is an acute angle of less than 90°, as is best shown in FIG. 6. An included angle of about 80° is preferred.

Adjacent the free end of the rod 18 is a spring clip 23 which is capable of releasably retaining between itself and the rod 18 a fishing line, for a purpose to be explained hereinafter.

The arm 12 of the control member preferably, but not necessarily, is encircled by a torsion spring 24 terminating at one end in a finger 25 which bears against the support 1 and terminating at its other end in an arm 26 having its free end formed as a hook 27 that is adapted to embrace the adjacent bail arm 10. The spring 24 constantly biases the control member 9 to swing in a counterclockwise direction from the full line position shown in FIG. 1 to the dotted line position.

The tip-up apparatus is adapted for use with a fishing rod 28 comprising a rod-like member 29 terminating at one end in a handle 30 on which a reel 31 is mounted for rotation about a shaft 32. The reel 31 has a handle 33 by means of which the reel may be rotated to wind a fishing line 34 on the reel. The free end of the rod member 29 supports an eyelet 35 through which the line 34 may pass.

The tip-up apparatus preferably includes a mounting block 36 that is pivoted on the member 1 by means of a bolt 37 having a threaded end adapted for reception of a wing nut or clamp 38. The block 36 has spring retaining arms 39 which removably grip the rod handle 30 so as to provide releasable retaining means for the rod 28.

The tip-up apparatus preferably includes a line guide 40 comprising an arm 41 one end of which is fitted into a slot 42 formed in the member 1 and passes around a bolt 43 having a threaded end on which is mounted a wing nut 44. The other end of the line guide 40 has an enlarged eye 45. The ling guide 40 may be swung about the axis of the bolt 43, as is indicated by the arrows in FIG. 1, and be retained in any selected position of adjustment by means of the wing nut 44.

To condition the apparatus for use, the member 1 is supported in upright position adjacent a hole formed in ice covering a body of water. If the rod 28 is used, the line 34, having a baited hook or a lure at its free end, is unwound from the reel 31 until such time as the hook or lure is located at a desired level above the bottom of the body of water. The signal arm 3 then is bowed from the upright position shown in dotted lines in FIG. 1, and the control member 9 is swung clockwise about the axis of the arm 12 to enable the tongue 14 to be accommodated in the coupling loop 7. The length of the signal arm 3 and the position at which the stud 2 is located are such that when the arm is in its bowed position, the loop 7 lies below the axis of the arm 12. To enable the tongue 14 to be accommodated in the loop 7, the control member 9 must be swung through a distance sufficient to enable it to lie wholly at the lower side of the axis about which is swung, as is indicated in full lines in FIGS. 1 and 2, so that the tongue may be thrust into the loop. In these positions of the parts the resilience of the spring portion 5 of the signal arm 3 will maintain the loop 7 snugly against the bail bight 11, thereby enabling the tongue 14 to project through the loop 7. The latch member 17 then may be swung from the dotted line position shown in FIG. 1 to the full line position and the knee 21 fitted into the slot formed by the limbs 15.

The forces exerted on the control member 9 by the springs 5 and 24 tend to swing the control member counterclockwise from the position shown in full lines in FIG. 1, but the curvature of the tongue 14 and the length of the latch member 17 between the loop 19 and the leg 22 are such that the force exerted by the tongue on the latch 17 is substantially parallel to the lower portion of the rod 18. As a consequence, the control member 9 will be maintained in the latched position shown in full lines in FIG. 1, and therefore, the signal arm 3 will be maintained in its cocked or retracted position.

The length of the latch member 17 is such that its upper end lies in the path of rotation of the reel handle 33 so as to be engaged by the handle whenever a fish takes the baited hook or lure and causes the reel to be rotated in the direction of the arrows shown in FIG. 1. Following engagement of the handle 33 with the latch member 17, further rotation of the reel will cause the latch member to be swung in a direction to withdraw the knee from the tongue 14, whereupon the springs 5 and 24 will cause the control member 9 to be swung counterclockwise, as viewed in FIG. 1, to a position in which the coupling loop 7 disengages the tongue 14. The spring 5 then will act on the arm 3 to restore the latter to its projected, upright signaling position to signify that a fish has been hooked.

It is not necessary that the rod 28 be used with the tip-up apparatus. As is indicated in FIG. 3, a fishing line having a hook or lure at one end and being secured at its other end to some stationary object, such as the member 1, may have an intermediate portion passed through the eyelet 45 of the line guide 40 and fitted between the arm 18 of the latch member 17 and the clip 23. In these positions of the parts, a tug exerted on the line by a fish will swing the latch member 17 downwardly to withdraw the knee 21 from the tongue 14, whereupon the signaling arm 3 will be restored to its upright, signaling position.

Regardless of whether the fishing line 34 is used in association with a rod and reel or is passed through the eyelet of the line guide 40, movement of the hook end of the line in any direction by a fish will cause a force to be exerted on the latch member 17 in such direction as to remove the knee 21 from the tongue 14.

The spacing between the limbs 15 of the tongue 14 is only a little greater than the diameter of the latch rod 18, thereby preventing any significant movement of the knee 21 transversely of the tongue 14. As a consequence, the latch cannot move laterally a distance sufficient to exert a binding force on the tongue 14.

In the cocked position of the signaling arm 3 the coupling loop 7 completely encircles the tongue 14. Thus, regardless of high wind velocities it is not possible for the loop to disengage the tongue unless the latching member 17 first is disengaged from the tongue.

Although it is preferred to use the torsion spring 24, such a spring is not essential. The spring 24 may be eliminated altogether, or the hooked end 27 may be disengaged from the member 9. In either case, the force of the spring 5, when the arm 3 is in its cocked position, is sufficient to exert a biasing force on the member 9 urging it to swing from its latched position toward its loop-releasing position. As a consequence, withdrawal of the knee 21 from the tongue 14, even in the absence of the spring 24, assures movement of the signaling arm to its projected, signaling position.

Figure 2:
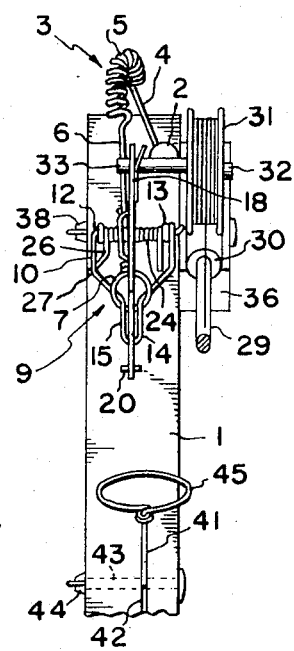
FIG. 2 is a front elevation, viewed in the direction of the arrows 2—2 of FIG. 1.

Shaping the knee 21 in such manner that the included angle $a$ is less than 90° makes it possible to vary the force which must be applied to the latch member 17 to effect release of the control member. For example, when the knee 21 is thrust into the tongue 14 to a position in which the tip 16 of the tongue lies at the apex of the angle $a$, as is shown in FIGS. 1 and 2, clockwise movement of the member 17 causes further stressing of the springs 5 and 24. On the other hand, if the knee 21 is not thrust so far into the tongue, withdrawal of the knee from the tongue will not necessitate as much additional stressing of the springs. One advantage of this construction is that relatively large minnows may be used as bait without tripping the latch member 17 by the bait.

When the tip-up is not in use, the post 2 may be rotated through 180° so as to enable the signaling arm 3 to overlie the member 1, the line guide 40 may be swung upwardly from the position shown in FIG. 1 to lie adjacent the support member 1, and the mounting block 36 may be swung to parallel the support member. The various parts of the tip-up thus may be adjusted so that the tip-up occupies the least possible amount of space for transport and storage.

The disclosed embodiment is representative of a presently preferred form of the invention, but is intended to be illustrative rather than definitive thereof. The invention is defined in the claims.

I claim:

1. A fishing tip-up comprising a support; a control tongue having a longitudinal slot therein mounted on said support for swinging movement about an axis from a first position lying to one side of said axis to a second position lying to the opposite side of said axis, and return; a resilient signal arm mounted at one end thereof on said support and at said one side of said axis and being of such length that when bowed its other end may extend to the opposite side of said axis; coupling means carried by said arm at said other end thereof for removable connection to said control member when the latter occupies said second position, the resilience of said arm when bowed biasing said control member to its first position when said coupling means is connected to said control member; and latching means movably mounted on said support for reception in said slot and for releasable engagement with said tongue when the latter occupies said second position, said latching means being movable relatively to said tongue in a direction to disengage the latter, whereby said arm is enabled to move said tongue from said second position toward said first position and effect disengagement of sad coupling means from said tongue.

2. Apparatus according to claim 1 including spring means biasing said tongue to said first position.

3. Apparatus according to claim 1 wherein said coupling means comprises a loop.

4. Apparatus according to claim 3 wherein said tongue is of such size as to be accommodated in said loop.

5. Apparatus according to claim 1 wherein said latching means comprises a rod having an angular knee between its ends.

6. Apparatus according to claim 5 wherein said knee forms an angle of less than 90°.

7. Apparatus according to claim 1 wherein said slot has a width corresponding substantially to, but slightly greater than, that of said latching means.

8. Apparatus according to claim 1 including means carried by said latching means for attaching a fish line thereto.

9. Apparatus according to claim 1 wherein said tongue comprises a bail having a pair of parallel legs joined at corresponding ends by a bight, said bight being curved along its length.

10. Apparatus according to claim 1 wherein said signal arm comprises an elongate rod shaped to form a spring between its ends.

11. Apparatus according to claim 1 including line guide means connected at one end thereof to said support at said opposite side of said axis and terminating at its opposite end in a loop.

12. Apparatus according to claim 1 including means carried by said support for supporting a reel around which a fishing line may be wound.

13. Apparatus according to claim 1 wherein said arm is mounted on said support for rotation relative thereto.

* * * * *